US006471876B1

(12) United States Patent
Hansen et al.

(10) Patent No.: US 6,471,876 B1
(45) Date of Patent: Oct. 29, 2002

(54) FILTER MEDIA WITH GERMICIDAL PROPERTIES

(75) Inventors: Christopher L. Hansen, Newbury, OH (US); Samuel Mason, Wickliffe, OH (US); Mohan L. Sanduja, Flushing, NY (US); Carl Horowitz, Brooklyn, NY (US); Felicia Dragnea, Forest Hills, NY (US); Paul Thottathil, New Hyde Park, NY (US)

(73) Assignee: Kinetico Incorporated, Newbury, OH (US)

( * ) Notice: Subject to any disclaimer, the term of this patent is extended or adjusted under 35 U.S.C. 154(b) by 88 days.

(21) Appl. No.: 09/722,911

(22) Filed: Nov. 27, 2000

(51) Int. Cl.$^7$ .................................................. C02F 1/50
(52) U.S. Cl. ........................ 210/764; 210/501; 210/504; 252/175
(58) Field of Search ................................. 210/764, 501, 210/504; 252/175

(56) References Cited

U.S. PATENT DOCUMENTS

| | | | |
|---|---|---|---|
| 4,111,713 A | * | 9/1978 | Beck |
| 4,725,390 A | * | 2/1988 | Laird et al. |
| 4,966,872 A | * | 10/1990 | Horowitz et al. |
| 5,618,762 A | * | 4/1997 | Shirakawa et al. |
| 6,287,462 B1 | * | 9/2001 | Likos |

* cited by examiner

*Primary Examiner*—Betsey Morrison Hoey
(74) *Attorney, Agent, or Firm*—Watts, Hoffmann, Fisher & Heinke, Co., LPA

(57) ABSTRACT

Filtration media having germicidal properties for use in filtering particles and deactivating, removing and/or destroying microorganisms from a feed liquid passing therethrough. The filtration media includes an effective amount of a germicidal chemically grafted and covalently bonded to a surface of the media. The germicidal grafted filter media is prepared by contacting the media with a grafting solution comprising an anionic monomer, a catalyst, a graft initiator and a germicide and subsequently curing tile media at an elevated temperature to chemically graft a polymerized salt of the polymerizable anionic monomer and the cationic germicide onto a surface of the media. Filter media suitable for use in the present invention include ceramic spheroids, hollow glass spheres, polymeric type media and thermoset coated glass spheres. The germicidal grafted filter media is effective for deactivating, destroying and/or removing from a feed liquid, such as water, *escherichia coli, salmonella choleraesuis*, staphylococcus, aspergsillus, klebisiella, *listeria clostridium*, rotavirus, cysts and other microorganisms. Moreover, the filter media can be used repeatedly without a decrease in its germicidal effectiveness.

22 Claims, No Drawings

FILTER MEDIA WITH GERMICIDAL PROPERTIES

FIELD OF THE INVENTION

The present invention is directed to filter media with germicidal properties. In particular, the present invention is directed to ceramic, polymeric and glass filter media to which is chemically grafted and bonded a polymerized salt of a polymerizable anionic monomer with a cationic germicide for use in water treatment.

BACKGROUND OF THE INVENTION

For close to a century, microorganism content, e.g., bacteria and viruses, in municipal water supplies has been controlled through the addition of oxidative chemicals such as chlorine. This has proven effective in control of most microorganisms and is readily simple to monitor. For example, a residual capable of being measured is carried throughout the municipal distribution system and periodically monitored to insure that the drinking water supply has been effectively treated. However, these systems are not always reliable or readily available to remote areas. Moreover, when an oxidizing agent is used at the source point, there can be contamination away from the source caused by pipeline problems that could allow the water to be unsafe at the time it arrives at the final point of use. In addition, there are also growing health concerns surrounding some of the compounds formed from the use of oxidative chemicals in the water supply.

To address contamination away from the source, a variety of devices or methods can be utilized to remove, destroy or deactivate microorganisms at the point of use. These include boiling the water, exposing the water to ultraviolet light, use of ozone, addition of chemicals and others. Most, if not all, of the methods used to remove, destroy and/or deactivate microorganisms include the need for external energy or the addition of chemicals to the water.

None of the known methods typically used to remove, destroy and/or deactivate microorganisms at the point of use can be used to remove sediment or turbidity from the source water. Typically, conventional filtration apparatuses are used in combination with a process or apparatus to destroy, deactivate and/or remove microorganisms. The filtration apparatuses are utilized primarily for removing particles in order to reduce turbidity. Examples of typical water filtration media include sand, garnet and anthracite.

In addition to bacteria and viruses present in the source, other microorganisms that can be harmful include protozoan cysts. Removal of harmful cysts is desired and is reflected in the EPA filtration requirements now mandated by the Surface Water Treatment Rule. Since some of these cysts are not destroyed and/or deactivated effectively by the typical chlorine dosages used in municipal application, filtration and the use of chemical coagulants are typically used. The chemical coagulants increase the size of the particles containing the cysts to a point at which they can be removed by conventional filtration. During coagulation, small particles are agglomerated into larger particles by adding the chemical coagulants to the source. Once agglomerates of a desired size are produced, the solution is passed through a filter to filter out the agglomerates.

However, chemical coagulation has several disadvantages. The mechanism for filtering the liquid is by physically straining particles from the feed solution which are larger than can pass through interstices between grains of the media. The media can only remove particles that are larger than the interstices. For example, sand filters can only remove particles greater than about 20 microns in size. Eventually, the particles held by the media seal off the interstices, reducing filtration efficiency. Moreover, chemical coagulation does not necessarily remove or deactivate all of the microorganisms present in the source water. Chemical coagulation is also disadvantageous in view of the cost of the chemicals, the need to regulate the amount of chemicals despite a continuously changing feed stream and in view of a low flow rate. Disposing of chemical sludge waste is another concern Thus, there is a need for a method and apparatus that could simultaneously filter and disinfect a water supply without the need for external energy or addition of chemicals.

SUMMARY OF THE INVENTION

The present invention is directed to filtration media having germicidal properties for use in filtering particles and simultaneously destroying, removing and/or deactivating microorganisms from a feed liquid passing therethrough. The filtration media comprises ceramic, polymeric and/or glass particles wherein the particles have chemically grafted and covalently bonded thereto in a germicidal effective amount a polymerized salt of a polymerizable anionic monomer and a cationic germicide. The polymerizable anionic monomer and the cationic germicide are present in about a 1:1 molar ratio. The cationic germicide preferably has a minimum inhibitory concentration less than about 1000 ppm (parts per million) for at least one targeted microorganism. Preferably, the cationic germicide is selected from the group consisting of bisguanidines and quaternary ammonium compounds. More preferably, the cationic germicide is selected from the group consisting of zinc pyrithione and diiodomethyl-p-tolylsulfone. The polymerizable anionic monomer is selected from the group consisting of a vinyl and acrylic monomer that preferably includes a carboxyl group or a sulfonyl group. The salt of the polymerizable anionic monomer and the cationic germicide may be copolymerized with at least one polymerizable monomer copolymerizable therewith. The amount of said anionic monomer is from about 10 to about 20 percent of the amount of said at least one other polymerizable monomer.

Preparing the germicidal grafted filter media includes preparing a grafting solution by mixing to a uniform solution a cationic germicide, at least one anionic monomer, a catalyst for initiating polymerization and a graft initiator. Then, the grafting solution is contacted with the filtration media to form a mixture which is then filtered to obtain a filtrate. The filtrate is dried and then cured at an elevated temperature effective to chemically graft and covalently bond to a surface of the media in a germicidal effective amount a polymerized salt of the polymerizable anionic monomer and the cationic germicide. Optionally, at least one other polymerizable monomer co-polymerizable with the anionic monomer and the cationic germicide.

The germicidal filter media is effective for purifying water by flowing source water across the germicidal filter media whereby the filter media removes particles and is in an effective amount for destroying, removing and/or deactivating microorganisms in the water.

Other embodiments of the invention are contemplated to provide particular features and structural variants of the basic elements. The specific embodiments referred to as well as possible variations and the various features and advantages of the invention will become better understood when considered in connection with the detailed description that follows.

DETAILED DESCRIPTION OF PREFERRED EMBODIMENTS

The present invention is generally directed to filter media having antimicrobial properties. In particular, filter media is contacted with a grafting solution wherein a germicide-polymer is grafted onto a surface of the filter media. Advantageously, filters including at least one layer of the germicidal grafted filter media are effective for deactivating, destroying or removing microorganisms from a feed liquid such as water. The filtration media is preferably selected so that a wide range of particle sizes and specific gravities can be attained. Thus, the present invention can advantageously be used in a wide variety of filter applications including its use in single layer, multi layer, upflow or downflow filtration configurations. Moreover, depending on the choice of germicidal grafted onto the filter media, the filter media, in addition to filtering particles, can be tailored to effectively remove, deactivate or destroy targeted bacteria, viruses or cysts present in the source feed liquid. This is especially desirable wherein the source feed liquid to be filtered is known to have undesirable levels of known microorganisms.

The materials suitable for use in the present invention as filter media include ceramics, polymers and glass. The media particles are preferably spherical or spheroidal but may be anhedral. The media particles are characterized by a generally coarse surface having a high surface area. A high surface area allows the use of smaller particle sizes for removing smaller particulate matter than conventionally used without affecting flow rates. Other suitable filtration materials will become apparent to those skilled in the art in view of this disclosure.

The grafting solution comprises a cationic germicide, polymerizable monomers including at least one anionic monomer, a catalyst, and a graft initiator. The monomer is preferably an anionic monomer having carboxyl or sulfonyl functional groups. The ratio of monomers to germicidal agent is preferably at about a 1:1 molar ratio.

Germicides are well known in the art. See, for instance, the section on "Quaternary Ammonium and Related Compounds" in the article on Antiseptics and Disinfectants" in Kirk-Othmer Encyclopedia of Chemical Technology 2nd Edition (vol. 2, pp.632–635). Preferably, the germicide is a cationic germicide having a broad spectrum of antimicrobial and antifungal activity. Among the most common of these are quaternary ammonium compounds such as benzethonium chloride. Others of this class (and generic formulas and descriptions thereof) are those mentioned, for instance in U.S. Pat. Nos. 2,984,639, 3,325,402, 3,703,583 and 3,431, 208 and British Patent No. 1,319,396. Usually one of the substituents on the quaternary nitrogen has a chain length of about 8 to 18 carbon atoms. A preferred quaternary ammonium compound is an alkyl dimethyl ethyl benzyl ammonium chloride compound sold under the trade name BARQUAT 42502 manufactured by Lonza Chemicals.

Other types of germicides suitable for use in the present invention are the omadines. Examples of omadines are the substituted guanidines, e.g., chlorhexidene and the corresponding compounds having 2-ethyihexyl groups instead of chlorophenyl groups, and other bisguanidines such as those described in German Patent Application No. P2,332,382 published Jan. 10, 1974. The following formula is representative of a bisguanidine suitable for use in the present invention:

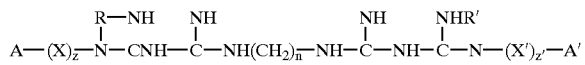

in which A and A' signify as the case may be either (1) a phenyl radical, which as substituent can contain up to 2 alkyl groups with from about 1 to about 4 carbons, a nitro group or a halogen atom, (2) an alkyl group which contains from 1 to about 12 carbon atoms, or (3) alicyclic groups with 4 to about 12 carbon atoms, X and X' as the case may be represent an alkylene radical with 1 to 3 carbon atoms, z and z' are as the case may be either zero or 1, R and R' as the case may be represent either hydrogen, an alkyl radical with 1 to about 12 carbon atoms or an aralkyl radical with 7 to about 12 carbon atoms, n is a whole integer from 2 to about 12 and the polyethylene chain $(CH2)_n$ can be interrupted by up to 6 ether, thioether, phenyl or naphthyl groups or the pharmaceutically acceptable salts thereof A preferred omadine is zinc pyrithione sold under the trade name ZINC OMADINE and manufactured by the Arch Chemical Company.

Other suitable germicides and equally preferred include diiodomethyl-p-tolylsulfone such as that sold under the trade name AMICAL 48 and manufactured by the Angus Chemical Company. Other germicides suitable for use in the present invention will be apparent to those skilled in the art in view of this disclosure. Most preferred are cationic germicides.

The germicidal compound is preferably one which has germicidal activity such that its minimum inhibitory concentration (MIC) is below 1000 ppm, more preferably the MfC is below 500 ppm. The MIC is an indicator recognized by those skilled in the art of the effectiveness of the germicide against certain known microorganisms. The MIC is determined by art recognized procedures that measure the lowest concentration of a test antimicrobial compound that prevents the growth of a given culture of microorganisms under standardized conditions. It has been found that the MIC less than 1000 ppm for a targeted microorganism is effective for removing, deactivating or destroying the, microorganism. For example, the MICs of zinc omadine and AMICAL 48 are given by the manufacturers as 4 ppm and 6.2ppm, respectively, for S. Aureuis bacteria and as such, is highly effective for removing, deactivating or destroying this particular species of bacteria, among others, at concentrations equal to or greater than the MICs given.

The cationic germicides that can be used in accordance with the present invention are those which will form salts with anionic monomers so that the resulting salt can be polymerized and grafted onto the filter media. Depending on the desired properties, the cati onic germicide may be used in combination with other cationic germicides. Preferably, the cationic germicide should be non-toxic and not cause any health concerns. Likewise, the other components of the grafting solution should be non-toxic.

The monomers suitable for use in the present invention are preferably anionic monomers that will form a salt with the cationic germicide. Preferred monomers include vinyl or acrylic monomers having sulfoonyl or carboxyl functional groups. It should be understood that the term "anionic monomers" refers to anionic polymerizable materials. These anionic polymerizable materials are generally monomers, but may also be partially polymerized that will undergo further polymerization under the proper reaction conditions.

Among suitable anionic monomers are those described in U.S. Pat. Nos. 2,984,639 and 3,325,402, incorporated herein by reference. As indicated above, the anionic monomers preferred are those which contain a sulfonyl or carboxyl functional group and are preferably those of the vinyl or acrylic type. Among these suitable monomers are ethylene imine, hydroxyethyl methacrylate, diethylamino ethylacrylate, dimethylaminoethyl methacrylate, ethylacrylate, butyl acrylate, as well as carboxylated and sulfonated vinyls such as vinyl chloride, vinyl pyrrolidine, vinylidene chloride, vinylidene bromide, etc. Other monomers suitable for use in the present invention will be apparent to those skilled in the art in view of this disclosure. Examples of suitable commercial monomers and prepolymers include those sold under the trade names SILANE A-99 manufactured by Angus Chemical Company, HYCAR 26288 manufactured by BF Goodrich Company, SR-344 manufactured by Sartomer Company and EPON 828 manufactured by Shell Chemicals.

The method of grafting the salts of the cationic germicide and anionic monomer comprises contacting the filter media with a solution of these materials in the presence of a catalyst and graft initiator. The graft initiator provides an active site on a surface of the filter media for reaction and forming a covalent bond with the germicidally active polymer. The graft initiator is selected to abstract an active hydrogen from a surface of the media to which the graft polymer will be bonded. It is preferred that the graft initiator is a metal ion provided by the ionization of a metal salt. Silver ions provided by the ionization of silver salts are especially preferred although ferric and ferrous ions abstracted from iron salts as well as other metal salts may also be advantageously used. When a silver salt such as silver nitrate, silver perchlorate and silver acetate is used, such salts are preferably present in the graft solution in an amount of from about 0.001% to about 0.01% by weight of the solution.

The catalyst functions as a free radical initiator for polymerization of the monomer to occur according to reaction pathways well known in the art. Additionally, the selected catalyst may function to ionize the metal salts used as the grafting initiators. Suitable catalysts for effecting such a reaction include peroxides, peresters, peracids and persulfates. Preferred catalysts include hydrogen peroxide, methyl ethyl ketone peroxide, urea peroxide and ammonium persulfate. Other catalysts will be apparent to one of ordinary skill inl the art in view of this disclosure. An example of a commercial catalysts suitable for use in the present invention include those sold under the trade name ANCAMRNE TETA and manufactured by Air Products, Inc.

As indicated above, the filter media having germicidal properties is prepared by admixing in a suitable solvent the cationic germicide, anionic monomer, graft initiator, and catalyst to a uniform solution. The filter media to be treated is then added to the liquid solution, stirred and subsequently filtered. The filtrate is air dried for about twenty four hours and then cured for a period of time at an elevated temperature. The curing time and temperatures used are dependent on the components chosen for the grafting solution and are well within the skills of those in the art to readily determine and optimize. The resulting filter media has chemically grafted and covalently bonded thereto in a germicidal effective amount a polymerized salt of a polymerizable anionic monomer and a cationic germicide and is ready for use. It has advantageously been found that the germicidal grafted filter media retains its germicidal properties after repeated use indicating that the germicide is chemically bonded and attached to the media.

The general reaction according to the present invention is believed to take place as follows:

wherein S represents the filter media, GI represents the graft initiator, S* represents the formation of a free radical on the filter media, C represents a catalyst, AM represents an anionic monomer and G represents a cationic germicide.

Depending on the desired properties, the grafting solution can include more than one type of monomer, catalyst or grafting initiator. In the case of more than one monomer, if the molecular amount of the co-mononmers is the same (n=m), the structure is as shown above. Generally, however, the ionic monomer is used in an amount of no more than about 10–20 mole percent. As a result, the actual molecule grafted onto the media may include more than one group of the second monomer. The cationic germicide is preferably used in approximately a 1:1 molar ratio with respect to the anionic monomer.

The germicidal grafted filter media is suitable for use in water filters including filters employing multiple layers of media for removing particulate matter from a liquid. The multiple layers of media can be made from the same or different synthetic materials. In the case of gradient filters, each layer of synthetic material preferably has a distinct particle size range and specific gravity range. The synthetic material can be formed of glass, ceramic, thermoset aggregates, thermoset coated materials, polymer particles, or any other suitable material and may be fabricated or otherwise classified to have different, predetermined specific gravities. Classification is less desirable since it is difficult to achieve both a desired particle size and intrinsic specific gravity in this manner compared to tailoring specific gravity during production of the material. As such, in addition to the more traditional downflow filter configurations, the media can be made for upflow filtration by tailoring the specific gravity of the media to be less than the specific gravity of the feed liquid. Other suitable filtration configurations utilizing the germicidally grafted filter media will become apparent to those skilled in the art in view of this disclosure.

The media particle sizes are generally defined by the mesh size of a sieve in which the particles are screened. For example, a 30 mesh sieve will allow particles less than 600 $\mu$m to pass through the sieve, whereas particles 600 $\mu$m or larger than will not pass through. Generally, sieves of varying mesh ratings are stacked and particles are separated using methods well known to those skilled in the art. The range of particles separated is defined by the mesh size of the sieves used. For example, a mesh size designation of 20/40 means that substantially all particles have a size ranging from 20 to 40 mesh (841–420 $\mu$m in diameter). A 30/50 designation indicates that substantially all particles have a size ranging from 30 to 50 mesh (595–297 $\mu$m in diameter). The particle sizes of the present invention are preferably not larger than about 10 mesh (about 2000 $\mu$m in diameter) and, as small as about 80 mesh (about 177 $\mu$m in diameter). In multi-layer filter configurations, the mesh sizes are preferably chosen so that particle size ranges do not overlap between the filter media layers.

One type of filter media suitable for use in the present invention is made from polymeric and/or glass material. An example of this type of filter media suitable for use in the present invention are glass phenolic coated hollow glass spheres sold under the trade name SYNTREX and manufactured by the Kinetico Company. The preparation of polymeric and/or glass gradient filter media suitable for use in the present invention has been described in U.S. Pat. No. 4,111,713, incorporated herein by reference in its entirety.

Parts of the following discussion of materials and methods for making the polymer and glass filter media suitable for use in the present invention is from U.S. Pat. No. 4,111,713. Parting agent particles and either solid granules of liquefiable binder material or already liquid globules of binder material are tumbled together to form hollow spheres.

A wide variety of binder materials may be used to form the hollow spheres. More than one ingredient can be included in the binder material, although these ingredients will generally be dissolved or uniformly dispersed in one another. The result is that in a hollow sphere, as formed at the end of the sphere forming operation and solidification of the binder material, the sphere wall comprises only a single layer or thickness of the binder material, plus parting agent particles at least partially embedded in the layer or wall. There may be a gradation in the composition of the layer from one edge to the other edge; and there may be pigments, flow-control agents, fire retarding agents or other fillers (besides the parting agent) contained in the binder material as a discontinuous phase or dispersion. But the wall is a single-layer wall formed as a void develops in the liquid globule of binder material.

Illustrative organic ingredients of binder materials include epoxy resins; polycarboduimides, formaldehyde resins such as phenol-formaldehydes, urea-formaldehydes and melamine-formaldehydes; polyesters; polyisocyanurates; polyurethanes; natural rubber and synthetic elastomers, such as silicones, styrene-butadiene copolymers; acrylic resins; ethylene copolymers such as ethylene-vinyl acetate copolymers; propylene copolymers such as ethylene-propylene copolymers; and olefin-wax combinations. These materials may be variously formulated to solidify, as by polymerization, by crosslinking, by loss of volatiles, or by cooling.

Inorganic binder materials such as the low melting glass described in U.S. Pat. No. 2,863,782 may also be used. Glass-forming binder material granules may be provided as spray dried "slip" particles, prepared as in glaze or enamel preparation, which simplify incorporation of avolatile void forming agent. In the case of the ceramic or metal parting agents, the binder material may be a low-cost flux (such as sodium carbonate, sodium borate, or sodium silicate) and may be in the form of a water solution thickened to the proper viscosity with a material such as sodium alginate. This thickener acts as a temporary binder material prior to sintering the principal binder material.

During the sphere forming operation, the binder material should achieve a viscosity that is low enough for the parting agent particles to be wetted by the globules, and preferably low enough so that any cells forming inside an evacuated globule will tend to at least partially coalesce, whereby binder material will be concentrated at the exterior spherical wall or shell of the sphere. At the same time, the viscosity of the binder material should be high enough so that the expanded globule will not deform excessively while sphere formation is taking place. The useful range of viscosities for the binder material is broad, ranging from at least about 50 to 100,000 centipoise, but an especially preferred range is between about 100 and 1000 centipoise. The globules of binder material in the tumbling, sphere forming operation are termed liquid herein, since even when at high viscosity they are flowable. The range of useful viscosities will vary with particle size and the ease with which the parting agent particles can be wet. Surfactants can be used as an ingredient in the binder material or as a treatment on the parting agent particle.

In general any solid discrete free-flowing particulate material, which is sufficiently inert to retain its parting function throughout the sphere-forming operation, can be used as a parting agent particle. Examples of parting agent particles are hollow or solid glass microspheres; byproduct fines; ground scrap rubber particles such as vulcanized scrap rubber from tires; hard irregular abrasive particles such as aluminum oxide granules used for abrasive products; magnetic iron oxide particles; perlite; clay; glass fibers or glass flakes; wood flour; flame retardants such as aluminum trihydrate; organic polymeric particles and metal particles. Mixtures of any of the above particles can be used. For example, parting agent particles providing better flow properties may be mixed with irregular parting agent particles; or mixtures may be used to provide pigmentation, flame retardancy, or variety in physical properties of the final sphere. Generally the parting agent particles will range from a few micrometers up to several hundred micrometers in size. They generally have adiameter no larger than the thickness of the wall of the final hollow sphere.

The void-forming agent used to form hollow spheres can be any substance which, while present in the binder material, evolves a gas during the time and at a temperature of formation of the hollow spheres. It may be a separate ingredient added to the binder material; it may be a byproduct of a reaction of the binder material; or it may be a solvent or carrier for the binder material. Often the void forming agent is incorporated into the binder material while the latter is in liquid form prior to being solidified and formed into granules. In other cases it is mixed with milled solid inert material which is then spray dried or compressed or otherwise prepared into granules.

Most often the void forming agent causes an expansion in size of the liquid globules being formed into hollow spheres, since at least initially the outer wall of the globule tends to form voids of the desired size. Examples of useful void forming agents are: in the case of polycarbodiimide, a carbon dioxide reaction product of curing of the polycarbodiimide, in the case of some elastomers, a solvent for the elastomer precursor, in the case of low melting glass, water from hydrated borate or water contained in other "slip" particles.

The granules or globules of binder material introduced will vary in size depending upon the size of hollow sphere that is ultimately desired. Typically the granules are between 100 micrometers and 1 centimeter in diameter, and most often are less than 5 millimeters in diameter.

Generally binder material granules in such a range of sizes produce hollow spheres about ½ millimeter to 2 centimeters in diameter. Spheres can be made with good uniformity of sizes by using binder material granules or globules of uniform size. Further, hollow spheres may be screened after formation to provide desired ranges of sizes.

The hollow spheres formed have a single hollow interior space enclosed by a single spherical wall or shell. The coarse exterior wall or shell is characterized by having a high surface area. The hollow spheres are particularly useful as buoyant media for upflow gradient filter configurations. The media can easily be made to a wide variety of specific gravities depending on the size of the void created in the sphere and the densities of the raw materials used. Achieving different specific gravities can be found in examples 1–24 disclosed in U.S. Pat. No. 4,111,713 and would be apparent to one skilled in the art in view of this disclosure.

Another type of media suitable for use in the present invention are ceramic. Ceramic particles suitable for use in the present invention can be made with the materials and processes described in U.S. Pat. Nos. 4,725,390 and 4,632,876, and in U.S. Pat. No. 6,054,059, herein incorporated by reference in their entireties. Preferred ceramic media include media sold under the trade name MACROLITE, manufactured by the Kinetico Company. The process for making the material generally includes the following steps. In the first step, binder, silicon carbide, mineral particulate and a metal oxide are mixed and spheroidized in order to form unfired spheroids. One example of suitable mineral particulates contains: 60% orthoclase, 10% nepheline, 10% hornblende, 5% diopside, 15% accessory minerals (titanite, apatite, magnetite and biotite) and trace amounts of secondary minerals (e.g. kac)linite and analcite). Another example contains approximately 75% plagioclase and orthoclase feldspar and 25% of the minerals pyroxene, hornblende, magnetite and quartz of which magnetite is less than 5%. Byproduct mineral fines of perlite (containing 2–5% chemically bound water) will also function as the mineral particulates. Minerals containing chemically bound water or sulfur which are useful components of the mineral particulates are: hornblende, apatite, biotite, pyrite, vermiculite and perlite.

Typical binders that may be useful as raw materials in the invention are bentonite (preferably sodium bentonite), starch, polyvinyl alcohol, cellulose gum, polyvinyl acetate and sodium lignosulphonate.

Silicon carbide raw material may conveniently be obtained as coproduct fines (less than 8 micrometers particle size) from the manufacture of silicon carbide abrasive products. It may alternatively be formed in situ, such as by adding a polycarbosilane solution to the mineral mixture which would convert into SiC during processing.

Several types of mixing equipment may be used such as balling pans or disk spheroidizing machines. Machines known as high energy mixers are well suited to this application. Two examples of such machines are the Littleford mixer and the machine known as the Eirich machine. The Eirich machine is described in U.S. Pat. No. 3,690,622.

There are four basic steps in making the unfired spheroids in a high energy mixer: (1) mixing the dry powders at high speed rotation of the pan and an impacting impeller of the machine; (2) nucleation at which time water is added to the region of the mixer near the impacting impeller to be dispersed into droplets; (3) growth of the spheroids in the manner of a snow ball with the powder agglomerating during which time the impacting impeller rotates at a slower speed than it did during the nucleation step; and (4) polishing or smoothing the surfaces of the spheroids by turning off the impacting impeller and allowing the pan to rotate, similar to a balling pan. Polishing is optional and is less preferred for use in the present invention.

The amount of binder may generally comprise about 1–5% by weight of the dry materials fed to the mixer and is generally sufficient to permit screening and handling of the spheroids without significant attrition or breakage.

The wet spheroids are discharged from the mixer and dried at a temperature of about 40° C. to 200° C. The dried spheroids are then typically screened. The particle size range selected is actually smaller than the desired end product because of the growth of the spheroids during firing.

The dried spheroids are next mixed with the parting agent, for example, alumina. The dry spheroids and parting agent may be mixed in a tumbling mixer such as a twin shell mixer or a cement mixer. The amount of parting agent usually ranges from 3 to 50 weight percent of the material fed to the kiln. Magnesium oxide, zircon, diaspore and high alumina clays may also be useful parting agents as discussed above, as well as other surface metal oxides.

The following are examples of specific metal oxides that may be used as parting agents in the present invention: alumina (less than 45 micrometers particle size obtained as A-2 alumina from Alcoa), magnesium oxide obtained as M-51 MgO from Fisher Scientific Company, and zircon (less than 45 micrometers particle size obtained from NL Industries). Aluminum and magnesium salts convert to oxides at elevated temperatures (e.g., $Al(OH)_3$ and $MgCO_3$ may be substituted for $Al_2O_3$ and MgO in mole equivalent amount). The particle size distribution of the parting agent depends on the desired end product.

The next step is to feed, typically by means of a vibratory feeder, the mixture of parting agenrt and dry spheroids to a rotary kiln. Firing may be done statically, but a rotary kiln is the preferred apparatus for this step. The residence time of the spheroids in a rotary kiln is dependent upon several parameters: kiln length, diameter, angle, and rotational speed, feed rate to the kiln, temperature within the kiln, gas atmosphere, and diameter of the spheroids. Residence time and temperature are adjusted to achieve the desired properties with each specific formulation for a given end use. With a typical residence time in a rotary kiln of 20 minutes or more, increasing the kiln temperature results in decreasing fired density of the spheroids. Firing temperature is typically above 100° C.

The ceramic spheroids are overfired, which allows for the formation of the internal air cells, making the finished product less dense. The firing atmosphere is air. The silicon carbide in the spheroids is oxidized during firing, the SiC near the surface being more extensively oxidized than that in the core.

Some of the metal oxide parting agent (e.g., alumina or magnesia) becomes part of the spheroids during the firing step. Metal oxide (e.g. $Al_2O_3$ or MgO) or a metal oxide precursor (e.g. $MgCO_3$ or $Al(OH_3)$) which converts to the metal oxide during firing, is incorporated into the spheroids as they pass through the kiln. Higher firing temperatures result in a thicker shell of parting agent on the spheroids. The coarser the particle size of the mineral particulate in the composition, the higher the required temperature, and more metal oxide is absorbed into the spheroids during firing to form an outer shell rich in metal oxide. Also, finer particle size distribution of the parting agent allows more metal oxide to be absorbed into the spheroids.

The use of metal oxides as parting agents is important for imparting an electrical net charge on the ceramic media particles. Tile electrical charge can be tailored depending on the metal oxides used in making the particles to have an electrical affinity for particulate matter. Ceramic particles having an electrical affinity for particulate matter that are suitable for the present invention are described in pending U.S. Pat. No. 6,054,059.

In addition to providing the filtration material with a desired electrical affinity, the surface metal oxides serve as parting agents that prevent the prills from sticking together as the intense heat is applied during firing. The surface metal oxides are located on the surface of each particle. However, the surfaces of the particles may not be composed entirely of the surface metal oxides. During firing, some of the surface may be occupied by the surface metal oxides and other portions of the surface may be occupied by the mineral fines. If magnesium oxide is used, a higher percentage of magnesium oxide on the surface may be required compared to the amount of aluminum oxide on the surface.

One example of ceramic filtration material having an electrical charge suitable for use in the present invention comprises the following composition (in % by weight): 96% mineral fines, which may be obtained from Minnesota Mining and Manufacturing Company; 3% bentonite clay, which may be obtained from the American Colloid Company; 1% silicon carbide, which may be obtained from Minnesota Mining and Manufacturing Company; and 14% water.

The dry raw materials are mixed with the water and agglomerated into "prills" having a desired size, with time and percentage of water being variable. The term "prill" as used herein means green or unfired particles of filtration material. The wet prills are dried in a rotating cylindrical gas heated drier. The particles are not completely dried, but are dried enough to be able to be screened and stored.

In a screening process, "on-size" material of desired size is separated from "off-size" material. The off-size material is recycled into the prilling process and the "on-size" material is stored in bulk bags. The on-size prills are proportionally mixed with the surface metal oxide, for example, aluminum oxide, and fed into a kiln.

In the firing stage, the on-size prills are heated in a kiln at a temperature ranging from about 2000 to 2200° F. A kiln that is 4 feet in diameter, 40 feet in length and set at an adjustable incline may be used. The kiln is preferably direct fired with gas as the fuel. The prills are introduced at the higher end of the kiln and as the kiln is rotated, they slowly travel to the lower end of the kiln. A gas burner is located in the center of the lower end of the kiln, which allows a flame to travel along the elongated horizontal axis of the kiln to produce the required temperature. An indirect fired kiln having gas jets disposed outside of the rotating cylinder may also be suitable for making the filtration material of the present invention.

Temperature and rotation are the variables during firing that are used to adjust the specific gravity of the material, as well as to produce different sizes of filtration material. The silicon carbide is involved in a reaction during firing that produces trapped gas within the particles. As a result of this reaction, the specific gravity of the particles may be adjusted as desired. For example, if a lower specific gravity is desired, the material is present in the kiln for a longer time and higher temperature, which generates more trapped gases. If a higher specific gravity is desired, the material spends less time in the kiln at a lower temperature. This enables a wide range of specific gravities and particle sizes of the filtration material to be produced. Specific temperatures and firing times vary with the particular composition of the material and desired specific gravity, but would be apparent by empirical observation to one skilled in the art in view of this disclosure.

Adjusting the specific gravity of the particles is important for gradient filters of the present invention. Of course, the specific gravity of the media for other filter configurations may not be of significance and will be apparent to one skilled in the art in view of the intended application for the filter. In gradient filters, each media layer has preferably a different specific gravity. More preferably, the difference in specific gravity between each ceramic media layer is at least 0.4 units or greater. This differential is important to prevent intermixing of the media layers during filtering and backwashing.

The specific gravities of the ceramic, glass or other particles are typically selected depending on the filter configuration. In a downflow configuration, the smallest particles would have the highest specific gravity whereas in an upflow configuration the smallest particles would have the lowest specific gravity. Specific gravity can be determined as is known by those skilled in the art by weighing a sample, measuring the volume of the sample with an air comparison pycnometer and calculating the weight per cubic centimeter. Alternatively, specific gravity can be calculated by determining the bulk volume density based on percent filling of the total volume by spheres, also known by those skilled in the art as the packing factor.

The product from the kiln is screened using standard methods known to those skilled in the art. The filtration material of the present invention has a final particle size range depending on the sieves used, for example, 20/40 and 30/50, which means that substantially all particles have a size ranging from 20 to 40 mesh (841–420 $\mu$m in diameter) and 30 to 50 mesh (595–297 $\mu$m in diameter), respectively. The particle size fraction is preferably not larger than about 10 mesh (about 2000 $\mu$m in diameter) and, as small as about 80 mesh (about 177 $\mu$m in diameter). The particle size is preferably selected, depending upon the composition of filtration material, to provide the material with electrical affinity characteristics that are suitable for removing particles about 3 $\mu$m and less. In many cases, the particle size of the ceramic material is much smaller than 20 mesh, for example, about 70/80 mesh. Ceramic particles of a size of not greater than 10 mesh and preferably about 80 mesh are used in the present invention. 80 mesh ceramic particles are able to remove particles about 3 $\mu$m and less from the feed liquid through a combination of physical straining and electrical affinity mechanisms. These small ceramic particles pack more closely together than larger particles and have a greater surface area, which increases the electrical affinity effect. Ceramic particles that do not exhibit the electrical affinity effect may also be used in the gradient filter of the present invention.

Either before, during or after the screening step, the fired spheroids may be subjected to vigorous agitation by air or some other agitation means or to a water washing step in order to remove dust from their surfaces.

Other types of filter media suitable for use in the present invention include polymeric filtration media such as beads of polypropylene, polycarbonate, polyacrylates, polyesters and the like, and inorganic filtration media such as silicate aggregates and the like.

The following examples are detailed description of methods of preparation and use of the composition of the present invention. The detailed preparations fall within the scope of, and serve to exemplify, the more generally described methods set forth above. The examples are presented for illustrative purposes only, and are not intended to limit the scope of the invention.

EXAMPLE 1

In this example, a grafting solution is prepared as follows:

| COMPONENTS | Parts by Weight |
| --- | --- |
| PART A | |
| Epoxy Prepolymer (ECON. 828) | 500 |
| Propylene Glycol Methyl Ether | 100 |
| Monomer SILANE A-99 | 5 |
| Acetone | 1000 |
| Polyethylene Glycol Diacrylate (SR344) | 1 |
| ZINC OMADINE | 15 |
| AMICAL 48 | 20 |
| 1% Methyl Ethyl Ketone Peroxide in MEK | 0.01 |
| 1% Silver Peroxide in water | 0.001 |

-continued

| COMPONENTS | Parts by Weight |
|---|---|
| PART B | |
| ANCAMINE TETA | 70 |
| Propylene glycol Methyl Ether | 51 |
| Acetone | 300 |

The components of Part A were combined and mixed to a uniform solution. Part B, containing the polymerization catalyst, was prepared separately from Part A and subsequently mixed with Part A prior to use. The mixing ratio by weight is 38.9 parts of Part A to 10 parts of Part B. The grafting solution is then ready for use.

EXAMPLE 2

In this example, a grafting solution is prepared according to example 1 as follows:

| COMPONENTS | Parts by Weight |
|---|---|
| PART A | |
| Epoxy Prepolymer (ECON. 828) | 580 |
| Propylene Glycol Methyl Ether | 141 |
| Monomer SILANE (a-99) | 6 |
| Acetone | 1,624 |
| Polyethylene Glycol Diacrylate (SR344) | 1 |
| ZINC OMADINE | 42 |
| AMICAL 48 | 15 |
| 1% Methyl Ethyl Ketone Peroxide in MEK | 0.01 |
| 1% Silver Peroxide in water | 0.001 |
| PART B | |
| ANCAMINE TETA | 70 |
| Propylene glycol Methyl Ether | 51 |
| Acetone | 464 |

The mixing ratio by weight is 41.2 parts of Part A to 10 parts of Part B.

EXAMPLE 3

In this example, ceramic filtration media was prepared by combining 45 lbs bentonite, 1440 lbs nephiline syenite, and 15 lbs silicon carbide parts. To this was added 15% by weight water. The combination was then mixed at a high speed in an Eirich mixer to form spheroids. The wet spheroids are then discharged from the Eirich mixer and dried at a temperature of about 93 ° C. The dried spheroids are screened to obtain a desired mesh size. The spheroids are then mixed with a fine powder (−325 mesh) of an aluminum oxide parting agent. The amount of parting agent used was about 200 lbs. The spheroids were then fired at 1200° C. for about 20 minutes. After firing, the spheroids are cooled and agitated by air to remove dust. The spheroids are then sorted by mesh size prior to use as ceramic filtration media. In this example, 70–80 mesh fired spheroids were collected and used as the filtration media in the following examples.

EXAMPLE 4

In this example, the grafting solution of Example 1 was slowly added to the ceramic filtration media of Example 3 to completely cover and wet the ceramic media. The amount of grafting solution added to the ceramic powder should be sufficient to completely cover and wet the ceramic media. The contents are stirred and then filtered. The treated (wet) powder is then stir dried for an additional 24 hours and finally, cured at 70° C. for 2 hours. The resulting cured filter media is ready for use as germicidal filter media.

EXAMPLE 5

In this example, the grafting solution of Example 2 was slowly added to the ceramic filtration media of Example 3 to completely cover and wet the ceramic media. The contents are stirred and then filtered. The treated (wet) powder is stir dried for an additional 24 hours and finally, cured at 70° C. for 2 hours. The resulting cured filter media is ready for use as germicidal filter media.

EXAMPLE 6

In this example, the germicidal filter media of Examples 4 and 5 were packed into a 500 milliliter glass column drinking water treatment units (DWTU) and conditioned. Each DWTU was tested initially using a theoretical contact time of thirty minutes. *Kiebsiella terregilia* was selected as the challenge organism for these trials. Challenge organism doses were propagated in accordance with the procedures outlined in the EPA Guide Standard and Protocol for Testing Microbiological Water Purifiers. The challenge dose was $1 \times 10^5$ colony forming units per milliliter (CFU/mL). The target reduction was greater than or equal to four ($\geq 4$) logs (~99.99%). Due to the low flow rate, the challenge organisms were seeded into a continuously mixing challenge reservoir rather than injected into the system flow. Influent (pretreatment) and effluent (post-treatment) samples were collected and analyzed for bacterial enumeration to document DWTU performance. Influent samples were collected as grab samples from the reservoir at the beginning, middle and end of the challenge period. The influent samples were composited for analysis, yielding a single pretreatment sample. The flow rate of the feed liquid was approximately 17 milliliters per minute. Flow was continuous during the test periods. System pressure was less than ten pounds per square inch gauge (psig). Each DWTU was tested three times to allow for an assessment of variability. The three trials were performed sequentially, with a fifteen minute flushing period in between trials. One negative control sample was collected prior to each trial. The entire effluent flow was collected by filtration (0.45 $\mu$m, sterile filters). All samples were analyzed in triplicate in accordance with standard procedures. The results are shown in Table 1.

TABLE I

| Media Sample No. | Average Log10 Reduction Value |
|---|---|
| Example 4 | >8.1 |
| Example 5 | 7.2 |

The results indicate excellent removal, deactivation and destruction of *Klebsiella terregina* by the germicidal grafted filter media of Examples 4 and 5.

EXAMPLE 7

In this example, three trials were sequentially performed on each DWTU containing the filter media of examples 4 and 5 to assess the variability in performance and the effectiveness of the media after repeated use. Prior to propagation of the challenge dose, the challenge organism, *Klehsiella terregiica*, was identified using ASI's Biolog bacterial identification system for configuration. Challenge doses were then be propagated from a single colony of *Klebhsiellca lerlegitia*. One negative control sample was collected from the effluent sample port prior to each trial. The control sample was analyzed concurrently with the influent and effluent samples. In addition, water remaining in the challenge reservoir after completion of each trial was sampled and analyzed. These data were not used in the reduction calculations, but were to ensure that a disproportionate percentage of the challenge dose does not remain in the reservoir. Influent samples served as positive control samples documenting recovery of target organisms. The results are shown in Table II.

TABLE II

| Media Example No. | Run No. | Average Influent Colony Forming Unit | Average Effluent Colony Forming Unit | Log Reduction |
|---|---|---|---|---|
| 4 | 1 | 1.6E+08 | <1 | >8.2 |
| 4 | 2 | 1.3E+08 | <1 | >8.0 |
| 4 | 3 | 1.0E+08 | <1 | >8.1 |
| 5 | 1 | 2.0E+08 | 25 | 6.9 |
| 5 | 2 | 1.8E+08 | 11 | 7.2 |
| 5 | 3 | 1.8E+08 | 7 | 7.4 |

The results clearly indicate the efficiency of the germicidal grafted filter media for removing, deactivating, and/or destroying the challenge organisms. More importantly, the data suggests that the media is stable and the germicidal activity is sustained after repeated use.

EXAMPLE 8

In this example, the effect of contact time with the media of examples 4 and 5 was measured. Influent concentrations were between 2 and 4 million colony forming units (CFU) per milliliter. The heterotrophic plate count, formerly known as the standard plate count, was the procedure used for estimating the number of live heterotrophic bacteria in the water samples. The colonies measured by this method include pairs, chains, clusters or single cell bacteria, all of which are included in the term "colony forming unit". The results are shown in

TABLE III

| Empty Bed Contact Time (seconds) | Example 4, Log reduction | Example 5, Log reduction |
|---|---|---|
| 20 | 2.6 | 2.2 |
| 30 | 2.1 | 2.5 |
| 60 | 2.4 | 2.5 |
| 100 | 3.1 | 4.9 |
| 150 | 5.3 | 5.3 |
| 200 | 5.6 | 5.4 |
| 300 | 5.3 | 5.3 |
| 600 | 5.5 | 5.3 |

The results indicate that contact times of the influent with the media for about 150 seconds and greater resulted in an effluent with less than 10 CFU/ml. It is important to note that the detection limit for this method is 10 CFU/ml, so the maximum log reduction possible for these tests was 5.6. Contact times less than 150 seconds showed a significant reduction in influent versus effluent CFUs.

EXAMPLE 9

In this example, the effectiveness of the filter media for destroying, deactivating and/or removing viruses was determined. Filters containing the filter media of examples 4 and 5 were prepared in accordance with example 6. MS2 bacteriophage challenge organisms were propagated in accordance with the procedures outlined in EPA Guide Standard and Protocol for testing Microbiological Water Purifiers. The Guide Standard indicates $1\times10^7$ plaque forming units per liter (PFU/L) as the challenge dose. Effluent samples were collected by sterile pipette and analyzed by the double agar overlay method. *E. Coli* was used as the bacterial host to enumerate bacteriophage MS2. The results are shown in table IV.

TABLE IV

| Media | Average Applied Dose (PFU/mL) | Average Effluent Count (PFU/mL) | Log Reduction Value |
|---|---|---|---|
| Example 4 | 6.8E+06 | <0.33 | >7.31 |
| Example 4 | 8.9E+06 | 0.33 | 7.43 |
| Example 4 | 7.6E+06 | <0.33 | >7.36 |
| Example 5 | 6.1E+06 | <0.33 | >7.27 |
| Example 5 | 8.5E+06 | <0.33 | >7.41 |
| Example 5 | 1.2E+06 | <0.33 | >7.56 |

The media tested achieved consistently excellent log removals of under the experimental conditions outlined. All negative control samples collected from the effluent sample port prior to each trial were negative for MS2. Seeded influent samples (pretreatment) were positive for MS2. The results demonstrate the effectiveness for removing and/or destroying the MS2 bacteriophages from the feed liquid.

EXAMPLE 10

In this example, 100 grams of the germicidal media of examples 3 and 5 was added to 1 liter of water to determine whether the germicidal polymer leached from the media into the water after a period of exposure and agitation. A control without the graft was used as a baseline. The pH and conductivity were measured after 1 hour and after 20 hours of continuous stirring. The results are shown in table V.

TABLE V

| Media | pH | | Conductivity ($\mu$ohms) | |
|---|---|---|---|---|
| | 1 hour | 20 hours | 1 hour | 20 hours |
| Control (no graft) | 8.11 | 9.06 | 24 | 54 |
| Example 4 | 8.84 | 8.88 | 98 | 124 |
| Example 5 | 9.15 | 9.04 | 176 | 202 |

The results show that conductivity was negligible for the germicidal filter media compared to the control after 20 hours of continuous stirring. The measured pH for the germicidal grafted media was relatively constant. These results indicate that the germicidal polymer is tightly bound to the media and after extended agitation will not be easily removed.

Many modifications and variations of the invention will be apparent to those skilled in the art in light of the foregoing disclosure. Therefore, it is to be understood that, within the scope of the appended claims, the invention can be practiced otherwise than has been specifically shown and described.

What is claimed is:

1. Filtration media having germicidal properties for use in filtering and removing particles and simultaneously destroying, removing and/or deactivating microorganisms from a feed liquid passing therethrough, said filtration media having chemically grafted and covalently bonded thereto in a germicidal effective amount a polymerized salt of a polymerizable anionic monomer and a cationic germicide, wherein said filtration media comprises glass hollow spheres.

2. The filtration media according to claim 1 wherein said glass hollow spheres comprise silicates and phenol embedded in the wall of the hollow spheres.

3. The filtration media according to claim 1 wherein said glass hollow spheres further comprise an elastomeric coating about an exterior surface of said spheres.

4. The filtration media according to claim 1 wherein said polymerizable anionic monomer and said cationic germicide are present in about a 1:1 molar ratio.

5. The filtration media according to claim 1 wherein said cationic germicide has a minimum inhibitory concentration less than about 1000 ppm for at least one targeted microorganism.

6. The filtration media according to claim 1 wherein said cationic germicide has a minimum inhibitory concentration less than about 10 ppm for S. Aureus.

7. The filtration media according to claim 1 wherein said cationic germicide is selected from the group consisting of zinc pyrithione and diiodomethyl-p-tolylsulfone.

8. The filtration media according to claim 1 wherein said polymerizable anionic monomer is selected from the group consisting of a vinyl and acrylic monomer.

9. The filtration media according to claimed 8 wherein said polymerizable anionic monomer includes a carboxyl functional group.

10. The filtration media according to claim 8 wherein said polymerizable anionic monomer includes a sulfonyl functional group.

11. The filtration media according to claim 1 wherein said salt of said polymerizable anionic monomer and said cationic germicide is copolymerized with at least one polymerizable monomer copolymerizable therewith.

12. The filtration media according to claim 1 wherein the amount of said anionic monomer is from about 10 to about 20 percent of the amount of said at least one other polymerizable monomer.

13. The filtration media according to claim 1 wherein said cationic germicide is selected from the group consisting of bisguanidines and quaternary ammonium compounds.

14. A method of preparing germicidal grafted filter media comprising:

a) preparing a grafting solution comprising mixing to a uniform solution a cationic germicide, at least one anionic monomer, a catalyst for initiating polymerization and a graft initiator, b) contacting said grafting solution with filtration media to form a mixture, wherein said filtration media comprises hollow glass spheres;

c) filtering said mixture to obtain a filtrate;

d) air drying said filtrate; and e) curing said filtrate at an elevated temperature effective to chemically graft and covalently bond to a surface of said spheres in a germicidal effective amount a polymerized salt of said polymerizable anionic monomer and said cationic germicide.

15. The method of claim 14 wherein said grafting solution further comprises at least one other polymerizable monomer co-polymerizable with said anionic monomer and said cationic germicide.

16. The method of claim 14 wherein the amount of said anionic monomer is from about 10 to about 20 percent of the amount of said at least one other polymerizable monomer.

17. The method of claim 14 wherein a molar ratio of said anionic monomer to said cationic germicide in said grafting solution is 1:1.

18. The method of claim 14 wherein said graft initiator is selected from the group consisting of silver, ferrous and ferric ions.

19. The method of claim 14 wherein said catalyst is selected from the group consisting of a hydrogen peroxide, a methyl ethyl ketone peroxide, a urea peroxide and an ammonium persulfate.

20. A method for purifying an aqueous based feed liquid comprising flowing a source feed liquid across filter media wherein said filter media comprises hollow glass spheres which has chemically grafted thereto a polymerized salt of a polymerizable anionic monomer and a cationic germicide whereby said filter media removes particles and destroys, removes and/or deactivates microorganisms in said feed liquid.

21. The method of claim 20 wherein the filter media and source feed liquid are free from chemical coagulants.

22. The method of claim 15 wherein the filter media comprises ceramic spheroids.

* * * * *